(12) United States Patent
Uden

(10) Patent No.: US 7,931,048 B2
(45) Date of Patent: Apr. 26, 2011

(54) WATER CONDITIONER

(76) Inventor: Robert Uden, Wagga Wagga (AU)

(*) Notice: Subject to any disclaimer, the term of this patent is extended or adjusted under 35 U.S.C. 154(b) by 91 days.

(21) Appl. No.: 10/599,872

(22) PCT Filed: Apr. 18, 2005

(86) PCT No.: PCT/AU2005/000549
§ 371 (c)(1),
(2), (4) Date: Oct. 12, 2006

(87) PCT Pub. No.: WO2005/100260
PCT Pub. Date: Oct. 27, 2005

(65) Prior Publication Data
US 2007/0209990 A1 Sep. 13, 2007

(30) Foreign Application Priority Data
Apr. 19, 2004 (AU) .................. 2004902083

(51) Int. Cl.
F15D 1/02 (2006.01)
(52) U.S. Cl. ............. 138/42; 138/44; 366/337; 366/340
(58) Field of Classification Search .................. 138/42, 138/44; 366/337, 340
See application file for complete search history.

(56) References Cited

U.S. PATENT DOCUMENTS

| 877,460 | A | * | 1/1908 | Brunner ........................... 55/444 |
| 1,844,108 | A | * | 2/1932 | Smythe ......................... 29/896.2 |
| 2,069,714 | A | * | 2/1937 | Getchell .......................... 138/42 |
| 2,359,288 | A | * | 10/1944 | Brinen ........................... 138/38 |
| 2,523,126 | A | * | 9/1950 | Long ............................ 261/78.2 |
| 2,688,986 | A | * | 9/1954 | O'Brien .......................... 138/38 |
| 3,266,437 | A | * | 8/1966 | Blackmore et al. ............. 138/41 |
| 3,783,938 | A | * | 1/1974 | Chartet ......................... 165/166 |
| 4,072,296 | A | * | 2/1978 | Doom ............................ 366/337 |
| 4,106,558 | A | * | 8/1978 | Neveux ....................... 165/109.1 |
| 4,140,625 | A | * | 2/1979 | Jensen .......................... 208/146 |
| 4,352,378 | A | * | 10/1982 | Bergmann et al. .............. 138/38 |
| 4,659,479 | A | | 4/1987 | Stickler et al. |
| RE33,444 | E | * | 11/1990 | Lerner ............................ 95/221 |
| 4,999,106 | A | | 3/1991 | Schindler |
| 5,404,913 | A | * | 4/1995 | Gilligan ......................... 138/37 |
| 5,456,533 | A | * | 10/1995 | Streiff et al. ................. 366/173.1 |
| 5,486,049 | A | * | 1/1996 | Boatman et al. ........... 366/175.2 |
| 5,611,907 | A | * | 3/1997 | Herbst et al. .................. 205/742 |
| 5,632,962 | A | * | 5/1997 | Baker et al. .................... 422/211 |
| 5,772,178 | A | * | 6/1998 | Bey ............................... 251/127 |
| 5,830,515 | A | * | 11/1998 | Pleasant et al. ............ 425/192 R |
| 6,106,146 | A | * | 8/2000 | Langecker et al. .......... 366/336 |
| 6,186,179 | B1 | | 2/2001 | Hill |
| 6,447,158 | B1 | * | 9/2002 | Farkas .......................... 366/316 |
| 6,482,318 | B1 | | 11/2002 | Reichwein et al. |
| 6,701,963 | B1 | | 3/2004 | Hill |
| 6,982,064 | B1 | * | 1/2006 | Ehrfeld et al. ................ 422/130 |
| 7,117,686 | B2 | * | 10/2006 | Jung et al. .................... 62/238.4 |
| 7,238,289 | B2 | * | 7/2007 | Suddath ........................ 210/748 |

FOREIGN PATENT DOCUMENTS

WO WO 95/08064 A1 3/1995
WO WO 95/19504 A1 7/1995

* cited by examiner

Primary Examiner — James F Hook
(74) Attorney, Agent, or Firm — Edwin D. Schindler

(57) ABSTRACT

A water conditioner includes a plate located diametrically across a pipe and a plurality of posts in lines on, or substantially parallel to, the longitudinal axis of the plane and extending from either side thereof, to be close to the periphery of a pipe with which the water conditioner is located. There may also be a plurality of ribs extending from either side of the plate and adjacent the posts for providing a plurality of discreet paths through the water conditioner.

9 Claims, 3 Drawing Sheets

WATER CONDITIONER

AREA OF THE INVENTION

Water Conditioners per se are well known and normally comprise a conditioning unit which is located in a pipe through which water is to be passed the conditioner unit having a convoluted outer surface to ensure that as water moves through the pipe a substantial part of this actually contacts either the pipe itself or the conditioning unit. The conditioning unit is maintained at a potential relative to the ground, either by electrochemical effects of by applying an EMF thereto and it has been found that the quality of the water which passes from the conditioner is substantially better than that which is unconditioned. In one particular application where the water is being used as an input to a boiler or cooling tower the scale which would normally form on the device is substantially reduced and often close to eliminated.

These systems have been extremely valuable in practice particularly for small and medium volume application. The conditioners have normally been cast and, to an extent, can be considered to have a substantial diameter relates to the internal diameter of the pipe as it is necessary to obtain the required water flow as discussed above.

BACKGROUND OF THE INVENTION

When one gets into larger diameter pipes then the conditioning unit can become of a substantial size and this makes it very expensive to cast and the total unit weight is very high.

OUTLINE OF THE INVENTION

It is an object of the invention to provide a water conditioner which minimises these difficulties.

It is also an object of the invention to provide a water conditioner which can be of any required size which is simpler and cheaper to manufacture than has previously been the case.

The water conditioner of the invention comprises a plate adapted to be located in a pipe and having, on at least one side thereof a number of means which cause water to adopt a required torturous flow through the pipe.

In a particular form of the invention the plate can be provided with a number of posts which can pass therethrough and which are normal thereto.

It may be preferred that between the posts there can be a number of longitudinal ribs.

The posts and the ribs, where provided, ensure that the flow of water through the conditioner is disturbed and that during passage water contacts at least one of the interior of the pipe, and/or the posts. Where ribs are provided, contact may also be made with these.

In a preferred form of the invention the ribs may be longitudinal but regularly displaced from the longitudinal axis and the ribs adjacent the centre of the plate can be higher than those adjacently edge of the plate so that when the conditioner is located in the pipe it substantially fills the interior of the pipe.

It is preferable that the ribs are of a height equivalent to the height of the adjacent posts.

DESCRIPTION OF AN EMBODIMENT OF THE INVENTION

In order that the invention be more readily understood we shall describe one particular embodiment of the invention together with some possible variations.

This embodiment is illustrated in relation to the accompanying drawings in which:—

Figure 1:
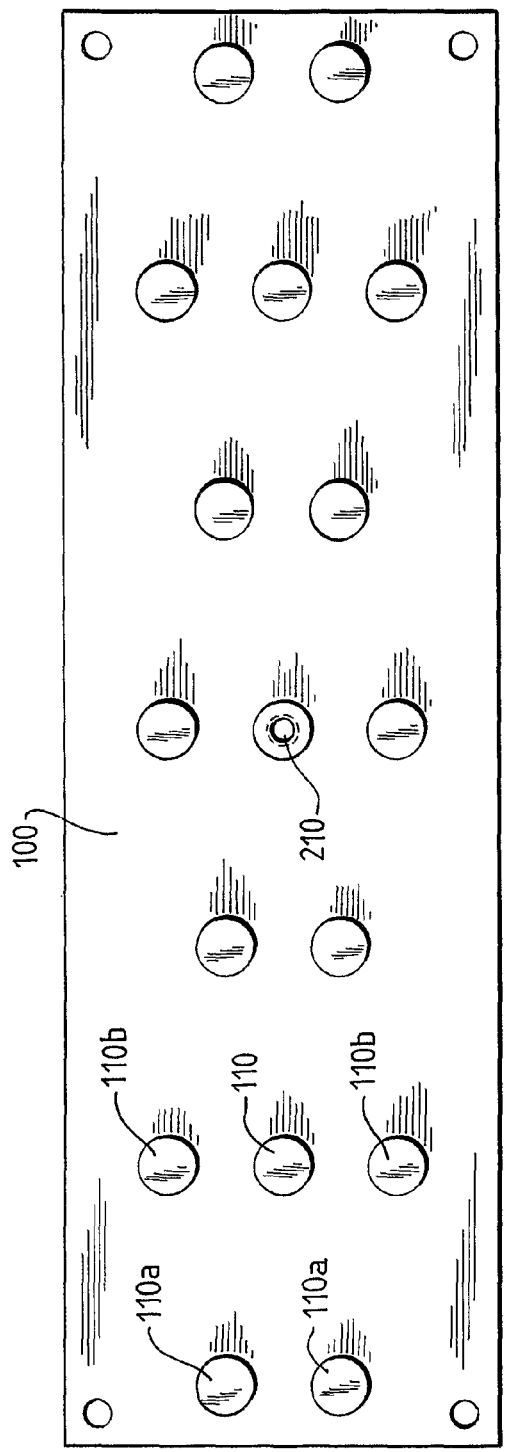
FIG. 1 is a plan view of the central plate of a first embodiment of the invention and shows the posts, from one side of the plate.
Figure 2:
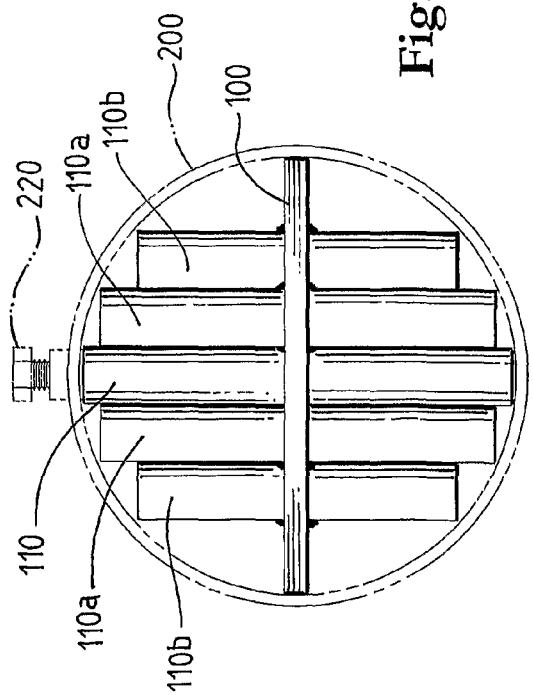
FIG. 2 is a view of one end of the plate located in a pipe and showing the posts extending through the plate on either side thereof.
Figure 3:
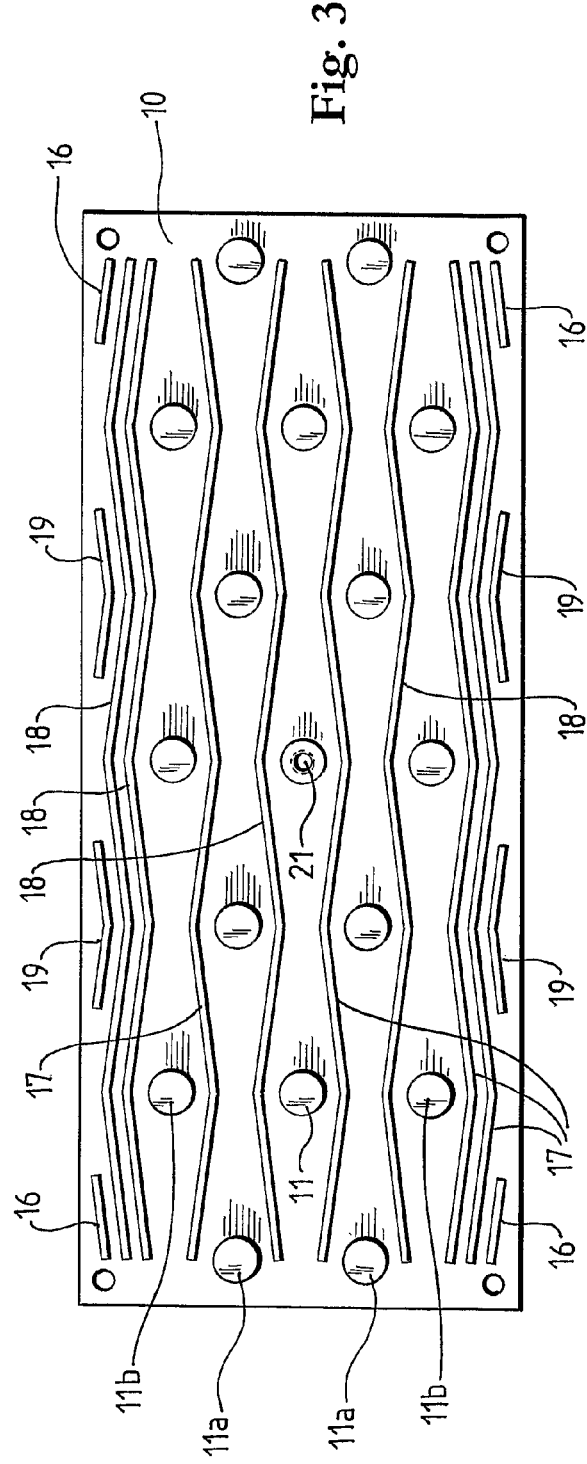
FIG. 3 is a plan view of a second embodiment of the invention showing the central plate.
Figure 4:
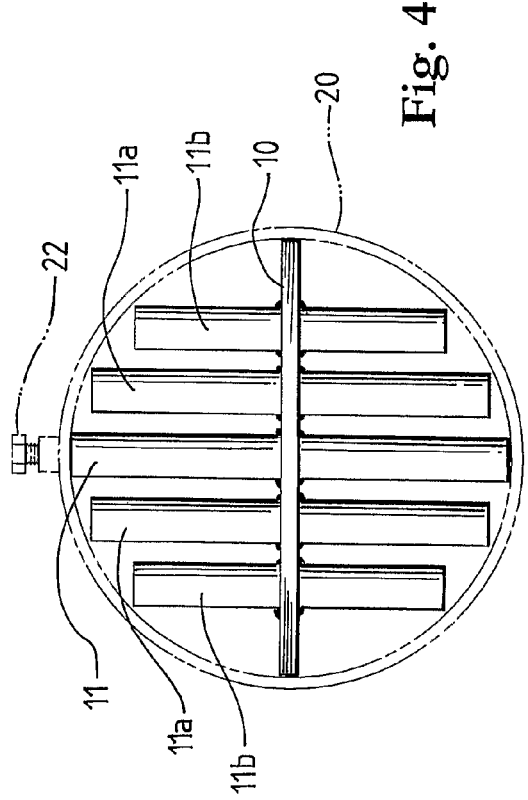
FIG. 4 is a view of one end of the plate of FIG. 3 showing the posts but, for clarity, omitting the ribs.
Figure 5:
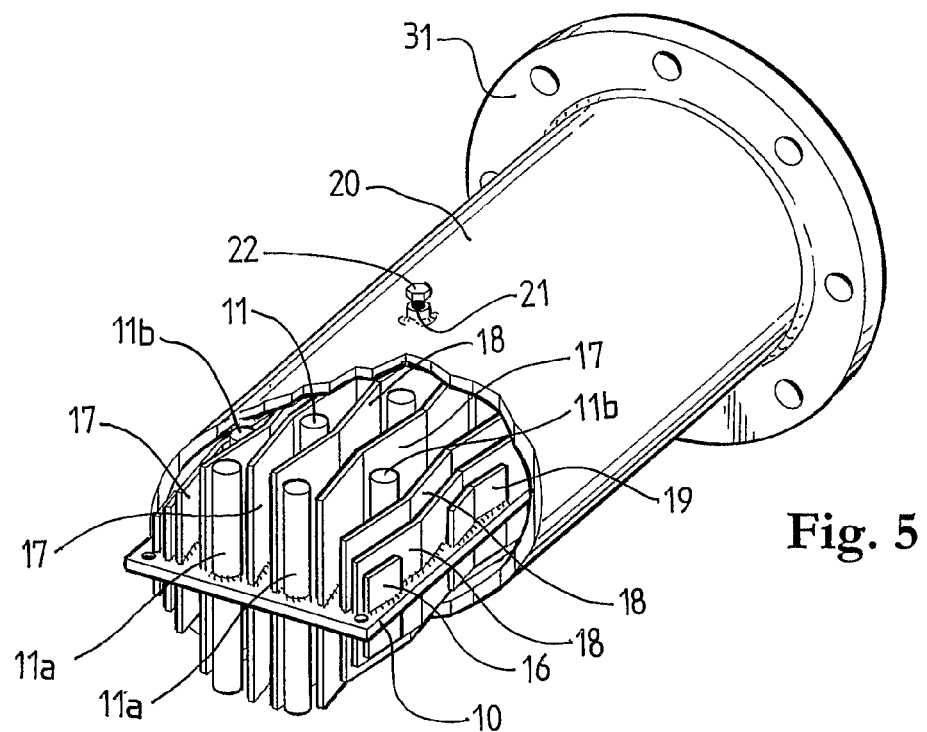
FIG. 5 is a partial prospective of the view of FIG. 2 showing, generally, the posts and the ribs.
Figure 6:
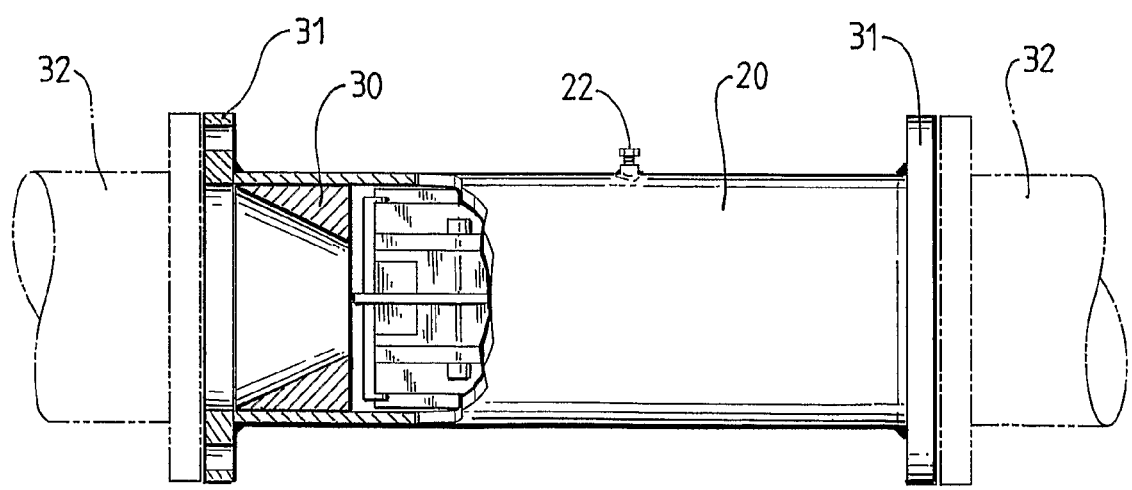
FIG. 6 shows the location of the water conditioner in a pipeline.

The two embodiments, that of FIGS. 1 and 2, and that of FIGS. 3 to 5, can encompass conditioners of all sizes, with that of FIGS. 1 and 2 being preferably for a smaller diameter conditioners and that of FIGS. 3 to 5 can be deemed to be one that will fit a 200 millimeter internal diameter pipe, but it is to be appreciated that this is to be purely for descriptive purposes.

Referring first to the embodiment of FIGS. 1 and 2, this embodiment is particularly suitable for smaller diameter conditioners and in this embodiment there is a central plate 100 which may be made of stainless steel or brass and which has a width sufficient to be locatable diametrically in a pipe 200. On the plate there can be a number of posts 110, 110*a* and 110*b*, and these posts may be located through holes in the plate 100 in a number of transverse rows, with the posts 110 being effectively of a length to closely fit within the diameter of the pipe 200.

The pipe may be of stainless steel or brass and may be welded to the plate 100.

The posts 110*a* are offset to each side of the posts 110 and are located longitudinally on the plate at spacings between the posts 110. The posts 110*a* are shorter than those 110, so again, they fit relatively closely within the periphery of the pipe. The posts 110*b* are outwardly of the posts 110*a* and are generally in alignment with the posts 110. That is, in the embodiment shown, there are three posts 110 and three posts 110*b* on either side thereof, but adjacent the edge of the plate, with four posts 110*a* on either side of the posts 110 and located generally centrally between the posts 110 and with one set adjacent each end of the plate.

The unit can be retained within the pipe in any required way, but as shown, I provide a tapped aperture 210 in at least one of the central posts and a corresponding stud 220 which can pass through an aperture in the pipe into the aperture 210, thus locating the device. Alternatively, the unit could be held in any other way, such as by brackets.

Referring to FIG. 3, there is a central plate 10 which is approximately 200 millimeters wide by 520 millimeters long. The plate may be made of stainless steel or brass but other materials could be used.

On the plate I provide five rows of posts 11, 11*a*, 11*b*, each of which lie normal to the plate 10 and each of which extends an equal distance on either side of the plate.

In the preferred form, the central row of posts 11 lie effectively on the longitudinal axis of the plate and have a height substantially equivalent to the diameter of the pipe, that is that they extend of the order of 100 mm on each side of the plate.

In the embodiment there may be three such posts one centrally along the length of the plate and the other two spaced therefrom.

The two adjacent rows 11a may have four posts two of which are located centrally between the three posts of the centre row and the remaining two adjacent the ends of the plate. The outer rows 11b may be located in position equivalent to that of the central row.

As the posts are located outwardly from the centre line so their length are reduced so that they terminate close to the internal periphery of the pipe 20 when the plate and posts are located therein.

Between the rows of posts, and outwardly of the outer rows there are ribs 17,18 which extend effectively the whole length of the plate and can be formed so that where they enclose a post 11, 11a, 11b they are at their widest spacing and centrally of these positions are at narrower spacing. Thus in plan the ribs have the effective wave shapes.

The ribs are welded to the plate and it will be seen, initially considering the ribs between rows of posts there is a path which, as far as the centre row is concerned starts relatively narrow, as the ribs are inwardly of the two outwardly located posts extend outwardly to pass on either side of the post of the row, are deformed inwardly to pass between the two adjacent posts, are deformed outwardly again to pass on either side of the post of the row and so on so that the passage various from narrow to broad to narrow. The two adjacent passages are effectively the same but offset so they go from broad to narrow to broad and so on.

Externally of the ribs which are outwardly of the outer rows of posts there may be additional rows or part rows of ribs 19, 20.

The height of the ribs will, as with the height of the posts vary from the tallest at the central rows to the shortest at the outer rows so that the conditioning unit generally can be received within the pipe with which it is to be used and to effectively ensure that there is no great spaces where water can streamline flow through the pipe.

Means are provided to retain the unit within the pipe and this may be by tapping as at 21 one or more of the posts so that a bolt 22 can pass through an aperture in the pipe and to be threaded into the tapped hole or holes. Alternatively we could provide brackets to hold the plate in position within the pipe.

The method of connection of the plate to the pipe is of no importance to the invention.

In use, in the arrangement shown in FIGS. 1 and 2, the conditioning area is such that water entering the pipe passes around the posts 110a and, as it moves through the pipe, is caused to pass around the other posts along the length. In each case, there is eddying on the downstream of the post so the water will not streamline throw through the pipe and will be caused to strike the post and/or the external wall of the conditioning unit as it passes therethrough.

In the arrangement of FIG. 3 to 5 the conditioning area is such that water entering the pipe passes between a pair of ribs and if it is in the central portion of the pipe will be caused to move outwardly around the posts be directed out towards the adjacent rib which is converging will then be permitted to move outwardly as the ribs commence to diverge until the next post is struck and so on.

This will mean that the water will not adopt a streamline flow and over its transit through the device will make physical contact with posts or ribs or pipe.

The water which passes around the outer portion of the plate will tend to move between ribs 17 or 18 and 16 and 19, but again, these are relatively closely spaced, are also shaped so the water will, again, contact the ribs or the pipe at some stage during this passage.

In each embodiment of the invention at the inlet side of the device I may provide an orifice which is in the form of a truncated cone 30 and tends to direct the water more towards the central portion of the device than the outer edges, but this is not critical.

Adjacent each end of the pipe I may provide a flange 31 or the like by means of which the device can be connected into a pipeline 32.

In use a voltage can be applied to the device in a manner which is well known in the art and water is caused to move along the pipeline, through the conditioning unit and back to the pipeline whilst, during the conditioning step, striking the ribs or the posts or the outside periphery of the pipe and any entrained material tends to receive an electrical charge.

The actual operation of the device is conventional.

The conditioning unit of the invention will generally be much cheaper to produce than a cast unit and yet can give extremely good results.

We have found that a conditioner for use with 200 mm pipe will be just over half the weight of a conventional conditioner of the same size which uses a substantial central casting to provide the water flow paths. We have also found that because the overall obstruction volume in the pipe is substantially less than if there is a substantial central casting, the throughput is approximately 70% more than using a more conventional device.

It will be appreciated that once conditioners are used in pipes of a diameter greater than 200 mm the size and weight of the conventional casting will increase at a rate very much greater than the increase of the diameter of the pipe and also the efficiency will reduce as the annular spacing between the outer surfaces of the conditioner and the inner surface of the pipe must be retained at a level such that all of the water passing through is still caused to strike the conditioner or the pipe.

For larger diameter pipes the new construction will be substantially more satisfactory than previous versions, it will be cheaper to fabricate rather than to cast the conditioning unit, they will have very much greater throughput, as the exposed area of the conditioner can be substantially greater than with a cast unit and they will be very much lighter than the equivalent size cast unit and even lighter if one is looking at the equivalent throughput cast unit.

Whilst we have described two particular configurations of the unit of the invention it is to be understood that various other configurations could provide an equivalent water flow and equivalent effectiveness.

The claims defining the invention are as follows:

1. A water conditioner, comprising:
    a pipe;
    a substantially flat plate extending along a substantial portion of a length of said pipe, said plate having a width substantially equal to an inner diameter of said pipe along an entirety of the length of said plate with said plate being located within said pipe; and,
    a plurality of cylindrical posts passing through, and extending, at solely a normal angle from each side of said plate to be adjacent an inner wall of said pipe, said plurality of cylindrical posts being perpendicular to a direction of flow through said pipe for causing water flowing through said pipe to adopt a torturous path through said pipe.

2. The water conditioner according to claim 1, wherein said plurality of posts are arranged in rows on, or parallel to, a longitudinal axis of said plate.

3. The water conditioner according to claim 1, further comprising a plurality of substantially longitudinal ribs extending lengthwise along said plate.

4. The water conditioner according to claim 3, wherein said plurality of substantially longitudinal ribs are regularly displaced from a longitudinal axis of said plate.

5. The water conditioner according to claim 3, wherein ribs of said plurality of substantially longitudinal ribs adjacent a center area of said plate are higher, or taller, than ribs adjacent an edge of said plate, so that when said plate is located within said pipe, said plurality of substantially longitudinal ribs are located adjacent an inner periphery of said pipe.

6. The water conditioner according to claim 3, wherein said plurality of substantially longitudinal ribs have a height that is substantially equal to that of adjacent posts of said plurality of posts.

7. The water conditioner according to claim 1, further comprising means for directing water coming into said water conditioner toward a central portion of said water conditioner.

8. The water conditioner according to claim 7, wherein said means for directing water coming into said water conditioner is a truncated conical member located in an inlet of said pipe.

9. The water conditioner according to claim 1, further comprising an EMF applied to said water conditioner.

* * * * *